H. F. HUTTON.
GRAIN SEPARATOR.
APPLICATION FILED JULY 31, 1913.
1,098,803.
Patented June 2, 1914.
2 SHEETS—SHEET 1.
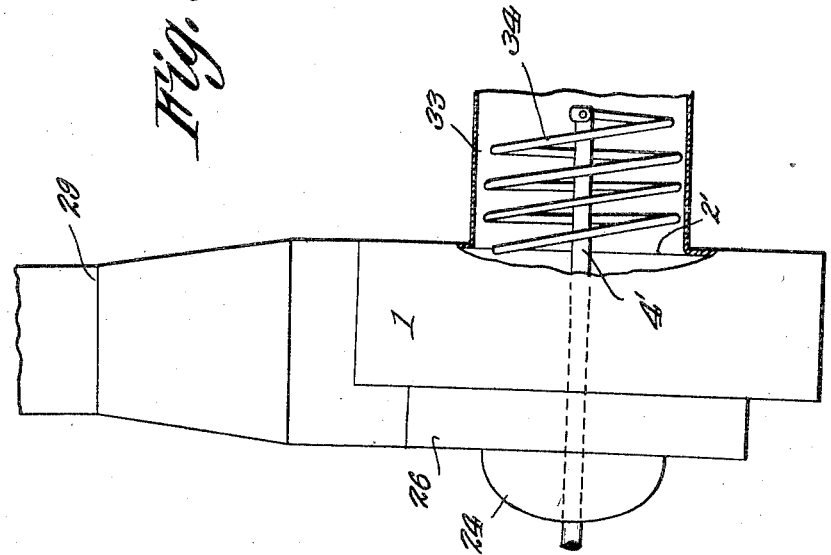
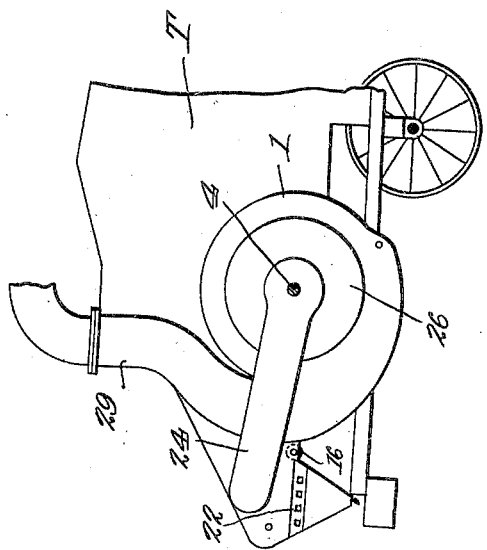
Witnesses
Homer F. Hutton,
Inventor,
by C. A. Snow & Co.
Attorneys.

H. F. HUTTON.
GRAIN SEPARATOR.
APPLICATION FILED JULY 31, 1913.
1,098,803.
Patented June 2, 1914.
2 SHEETS—SHEET 2.
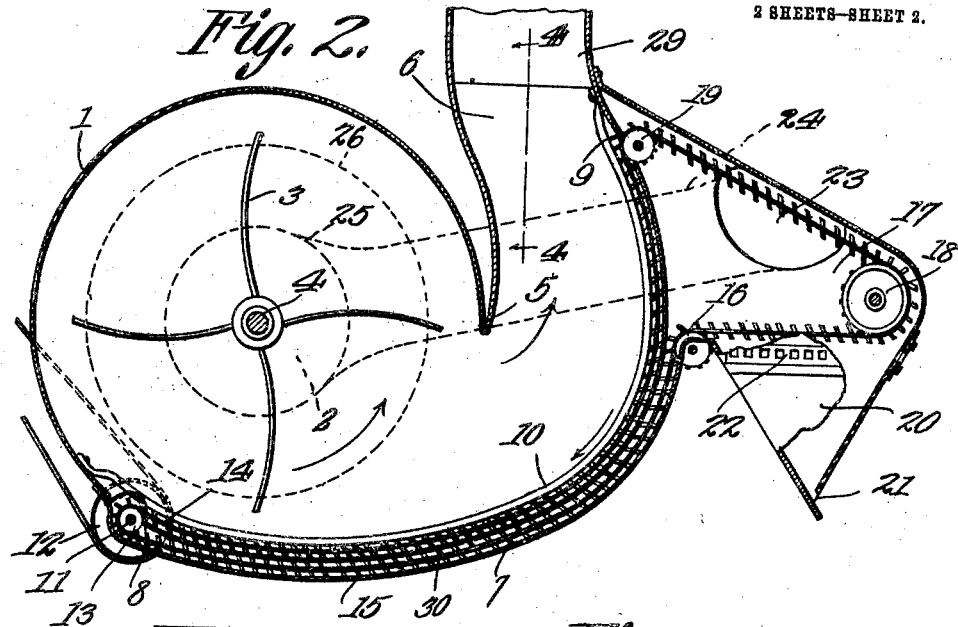
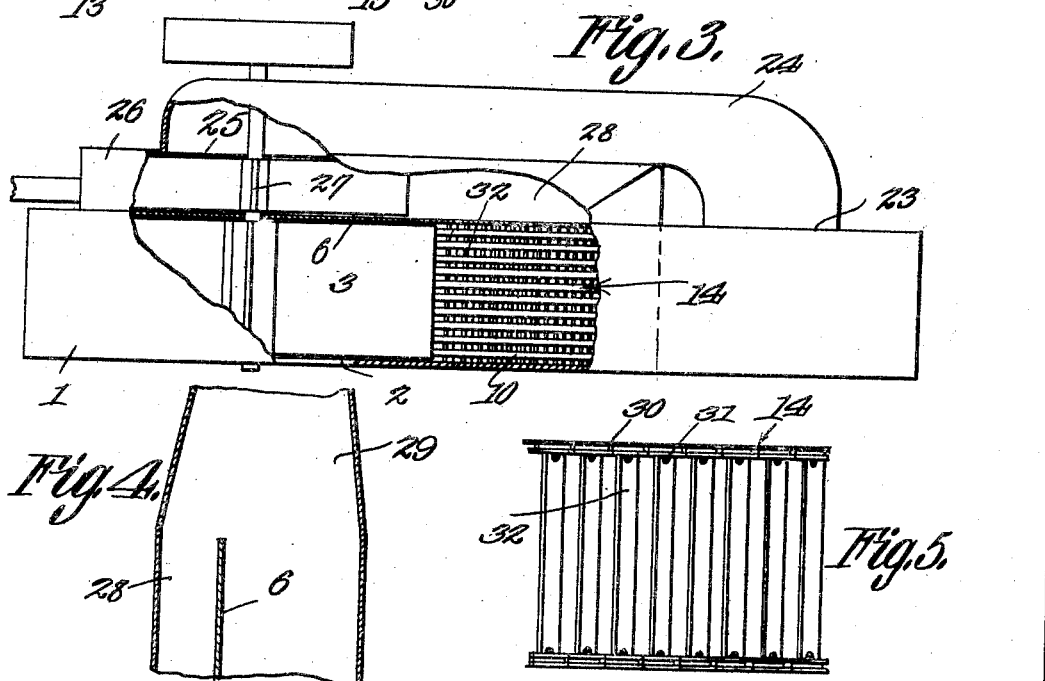
Witnesses
Homer F. Hutton, Inventor,
by C. A. Snow & Co.
Attorneys

UNITED STATES PATENT OFFICE.

HOMER F. HUTTON, OF JEFFERS, MONTANA.

GRAIN-SEPARATOR.

1,098,803.

Specification of Letters Patent.  Patented June 2, 1914.

Application filed July 31, 1913. Serial No. 782,341.

*To all whom it may concern:*

Be it known that I, HOMER F. HUTTON, a citizen of the United States, residing at Jeffers, in the county of Madison and State of Montana, have invented a new and useful Grain-Separator, of which the following is a specification.

The present invention relates to improvements in grain separators, particularly to a structure somewhat similar to that set forth in applicant's Patent No. 1,019,962 granted March 23, 1912, and therefore relating more particularly to the separation of the grain from the straw before the same is delivered through the fan of the pneumatic stacker mechanism of a threshing machine, the present invention being readily applied to the usual form of threshing machines or to a modified form, in which the intermediate cleaning and separating mechanism is dispensed with.

The main object of the present invention is the provision of means which will insure the separation of the grain from the straw and chaff while in the fan drum, the grain precipitated in the bottom thereof being moved in an opposite direction to the air blast and finally delivered through an auxiliary separating chamber where the residual chaff is further removed and the grain is permitted to fall by gravity.

A further object of the present invention is the provision of a mechanism of this character, which will economically handle the straw before it leaves the pneumatic stacker, and which will secure the maximum amount of grain usually carried away from the threshing machine with such straw.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of the rear end of a threshing machine with the present invention applied thereto. Fig. 2 is a vertical sectional view through the main blast fan chamber showing the position of the grain delivering mechanism and the straw blast mechanism, arrows indicating the direction of the travel of the straw and of the grain separating mechanism. Fig. 3 is a top plan view of the mechanism as shown in Fig. 3, the blast and suction fan casings being broken away to show the internal construction thereof. Fig. 4 is an enlarged detail sectional view taken on line 4—4 of Fig. 2. Fig. 5 is an enlarged detail view of a portion of the grain separating belt or endless conveyer. Fig. 6 is an end view of the present separator mechanism having means for delivering the straw into the main blast chamber.

Referring to the drawings, the numeral 1 designates the main fan chamber of the pneumatic stacker, the same being provided with the blast fan 3 mounted upon the shaft 4. The fan chamber is so constructed as to have the lip 5 produce a slightly constricted opening leading into the outlet portion adjacent the partition 6, which terminates at a point slightly above the upper ends of the slats 10, as clearly shown in Figs. 2 and 4, the purpose of which will presently appear. The fan chamber 1 is provided with the usual admission opening 2, for the straw from the threshing machine T, and as particularly shown in Fig. 1.

The bottom 7 of the casing is provided with the transverse slot 8 in one portion, and with a transverse slot 9 at a point adjacent or slightly below the upper edge of the partition 6, the purpose of which will presently appear. Slats 10 are disposed to parallel the bottom 7 from a point slightly above the slot 9 to a point beyond the slot 8, as illustrated in Fig. 2, and provides a means to permit of the separation of the grain from the straw and chaff due to the centrifugal action imparted thereto by the blast fan 3. By this means the centrifugal force imparted by the fan will cause the grain to be forced through the spaces between the slats 10 and upon the bottom 7 of the fan casing.

It has been found essential that some means be provided for removing the precipitated grain resting upon the bottom 7, and that such removal must be in the direction in opposition to the direction of the blast from the fan 3. In order to accomplish this, a drive shaft 11 is journaled adjacent to the slot 8 and is driven by the pulley 12 from any mechanism connected with the main power of the threshing machine. A roller 13 is mounted upon the shaft 11 within the slot 8 and has threaded thereover, the grain elevator or conveyer 14 of a chain and slat type, and as particularly shown in detail in Fig. 5. A casing 15 is disposed below the bottom 7 of the main casing and extends from a point beyond the slot 8, and terminates in the auxiliary separating casing 17. The conveyer 14, as before stated, is trained over the rollers or sprockets 18, passing through the chamber 15 and over the idlers 16, to the large sprocket 18 within the auxiliary casing 17, and inclines upwardly over the idlers 19 which are journaled adjacent to the slot 9. From thence the chain passes below the slats 10 and in parallel to the curved portion 7 of the fan casing so that any of the grain that is forced through the slats will enter the spaces between the scraping blades 32 carried by the lugs 31 of the chains 30 of the endless conveyer 14. These slats or strips 32 are inclined, as clearly shown in Fig. 2, so that the tendency of the blast from the fan 3 will be to drive grain into the acute angle pocket formed by the edge of each slat 32 and the adjacent portion of the bottom 7 of the fan casing. By this means, the grain will be properly delivered toward the slot 8, and finally through the casing 15 into the auxiliary hopper or casing 17.

The grain being heavier than the chaff or short pieces of straw that are carried by the endless conveyer will fall through the slat work 22 into the guiding hopper 20, which is provided with the reduced outlet 21. In order to provide a means for removing any chaff or short straw from the grain as the same enters the auxiliary casing 17, an opening 23 is provided in one wall of the casing 17, and in line with the upper portion or strand of the conveyer, as clearly illustrated in Fig. 2. Led from this opening 23, is a conduit 24, which is in communication with the central opening 25 of the suction fan casing 26. In this casing 26 upon the shaft 4, which is a common shaft for the fan 3, is the suction fan 27, thus providing a means whereby both fans are operated through the same mechanism. The suction casing 26 and the fan 27 is of less area than the blast fan casing 2, inasmuch as the amount of material removed through the opening 23 is exceedingly small in comparison to the amount that is carried into the main stack 29 by means of the blast fan 3. The outlet stack 28 of the suction fan casing 26 is parallel with the partition 6, as clearly illustrated in Fig. 4, and leads into the common outlet conduit 29 of the stacker.

By this means, it will be seen that the fan 3 acts upon the straw within the casing to cause the grain to be separated therefrom and be precipitated between the slats 10 and the transverse slats or strips 32 of the moving conveyer 14, such strips as before stated, being so positioned as to provide pockets for the reception of the grain which is forced more firmly into the pockets instead of having a tendency to be driven up into the stack 29. Thus the grain is properly delivered into the casing 15 and finally into the auxiliary casing 17, any remaining straw or chaff being drawn through the conduit 24 into the suction chamber 26 to be finally delivered into the common stack 29.

It is evident that the present device may be used in connection with the ordinary form of threshing machine, in which a pneumatic stacker is employed, it being particularly designed to secure the maximum amount of grain from the straw previous to its final delivery from the stacking conduit 29. It is also apparent that the present separator may be readily attached to a straw feeding means of a spiral type, as illustrated in a co-pending application filed even date herewith, Serial No. 782340, and as herein, the usual straw and grain separating means being interposed between the threshing cylinder and the stacker fan chamber.

In the form illustrated in Fig. 6, the inlet 2' of the blast fan chamber, has led thereto, a conduit 33, which receives the straw from the threshing mechanism, said conduit having disposed concentrically therein, the shaft 4' which carries the spiral member 34, to insure the feeding of the straw into the fan chamber regardless of the angular position of the fan chamber to the threshing machine. By this construction, the fan chamber may be placed in a higher position from the ground than is customary with the usual threshing machines, in which the straw is fed by gravity into the fan chamber and in which when the straw is wet or damp, has a great tendency to clog.

What is claimed is:—

1. A grain separator, having a main fan casing for receiving the straw to be stacked, means mounted therein and operating in an opposite direction to the blast from the fan to convey the grain precipitated by the blast and the centrifugal action imparted thereto by the fan, means for receiving the separated grain, an auxiliary means for removing the chaff and finer particles from the separated grain, and a common stack leading from the latter means and the main fan casing.

2. A grain separator, having a main fan casing for receiving the straw to be stacked, means mounted therein and operating in an opposite direction to the blast from the fan to convey grain precipitated by the blast and the centrifugal action imparted thereto by the fan, means for receiving the separated grain, a suction fan casing in communication with the grain separating means for removing the chaff and finer particles from the grain, and a stack common to the main fan casing and the suction fan casing for receiving the straw and chaff.

3. A grain separator, comprising a main blast suction fan and an auxiliary suction fan casing juxtaposed, a fan mounted in each casing, a common shaft for both fans, an endless chain conveyer disposed within the main fan casing for receiving the grain separated due to the blast and the centrifugal action imparted thereto by the main fan, an auxiliary casing for receiving the grain and through which the endless conveyer passes, and a conduit leading from said casing to the suction fan casing whereby the chaff and finer particles are removed from the finally separated grain.

4. A grain separator, comprising a main blast fan and an auxiliary suction fan casing juxtaposed, a fan mounted in each casing, a common shaft for both fans, an endless chain conveyer disposed within the main fan casing for receiving the grain separated due to the blast and centrifugal action imparted thereto by the main fan, an auxiliary casing for receiving the grain and through which the endless conveyer passes, a conduit leading from said casing to the suction fan casing whereby the chaff and finer particles are removed from the finally separated grain, and a stack common to the outlet of both fan casings.

5. A grain separator, comprising a main blast fan and an auxiliary suction fan casing juxtaposed, a fan mounted in each casing, a common stack for both fans, an endless chain conveyer disposed within the main fan casing for receiving the grain separated due to the blast and centrifugal action imparted thereto by the main fan, an auxiliary casing for receiving the grain and through which the endless conveyer passes, a conduit leading from said casing to the suction fan casing whereby the chaff and finer particles are removed from the finally separated grain, a conduit leading into the inlet of the main fan casing, one end of the shaft carrying the fan being projected thereinto, and a straw feeding member carried upon the end of said shaft within the conduit and operable simultaneously with both fans.

6. A grain separator, having a main fan casing for receiving the straw to be stacked, an auxiliary casing disposed adjacent to the main fan casing and having a grain outlet and air suction inlet, an endless grain conveyer disposed for passage adjacent the bottom of the main fan casing upon each side thereof and through the auxiliary casing, a casing for the endless conveyer disposed exteriorly of the bottom of the main fan casing and to the adjacent portion of the auxiliary casing, and means for creating a current of air through the auxiliary casing, said endless conveyer being composed of a plurality of chains, and transversely disposed slats, said slats being disposed to coact with the adjacent portion of the bottom of the fan casing and provide angular shaped pockets for the grain, and means for operating the chains in a direction opposite to the blast.

In testimony that I claim the foregoing as my own, I have hereto affixed my signature in the presence of two witnesses.

HOMER F. HUTTON.

Witnesses:
SELINA WILLSON,
I. E. SIMPSON.

Copies of this patent may be obtained for five cents each, by addressing the "Commissioner of Patents, Washington, D. C."